May 16, 1967  P. W. NICHOLS  3,319,921
ADJUSTABLE ELECTRICALLY POWERED AIRCRAFT SEAT
Filed April 30, 1965  3 Sheets-Sheet 1

INVENTOR.
PROCTOR W. NICHOLS
BY
Anderson, Spangler & Wymore
ATTORNEYS

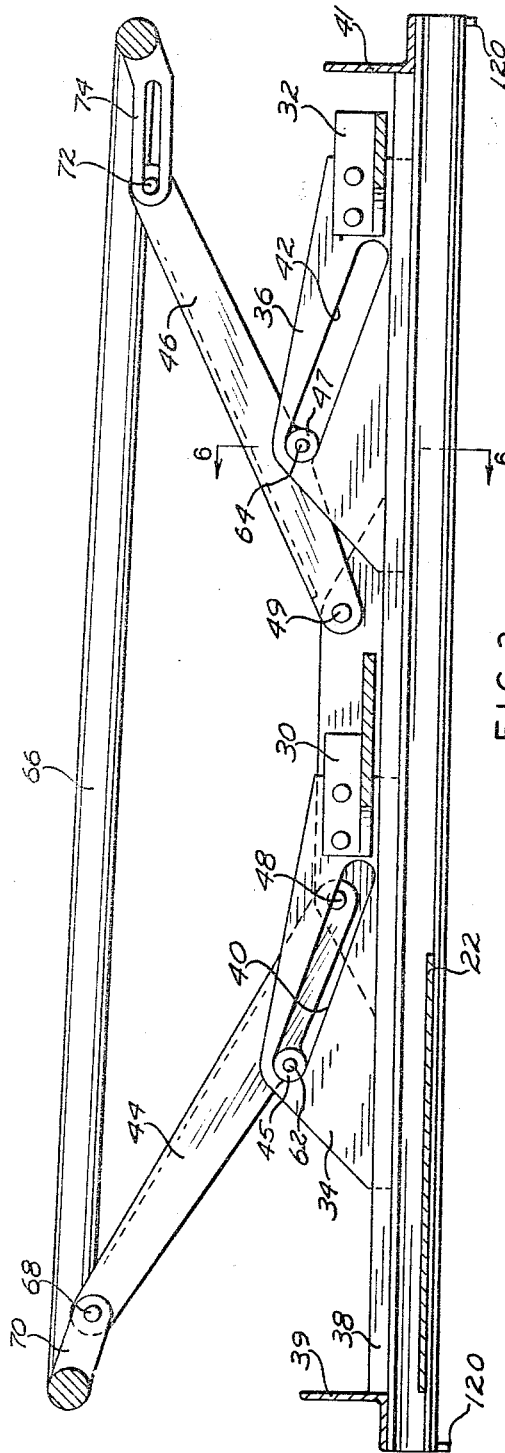
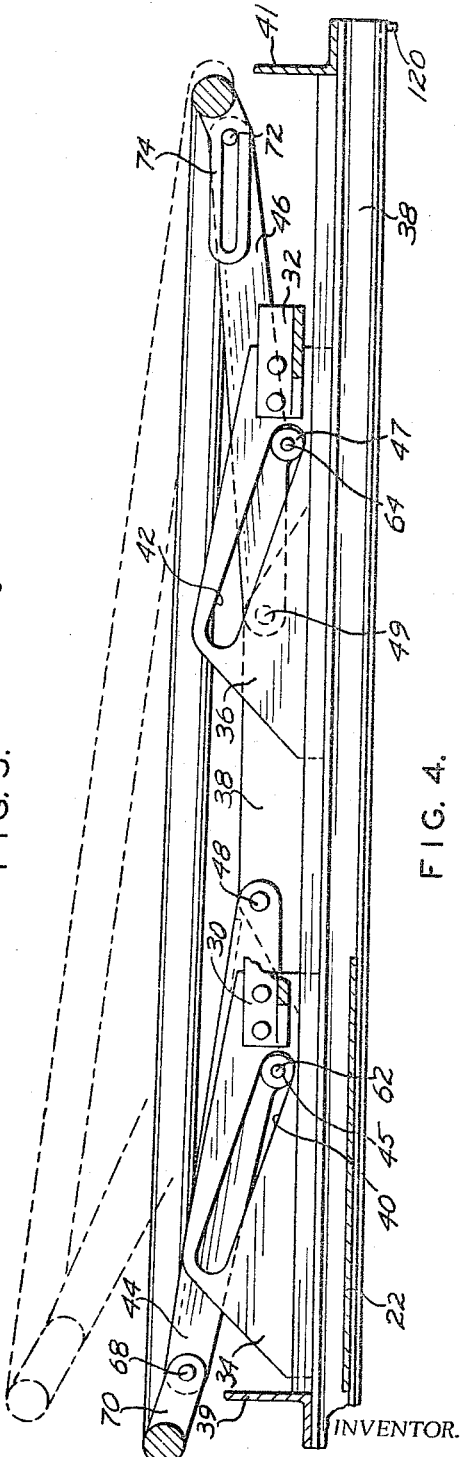
FIG. 3.
FIG. 4.
INVENTOR.
PROCTOR W. NICHOLS
BY
Anderson, Spangler & Wymore
ATTORNEYS

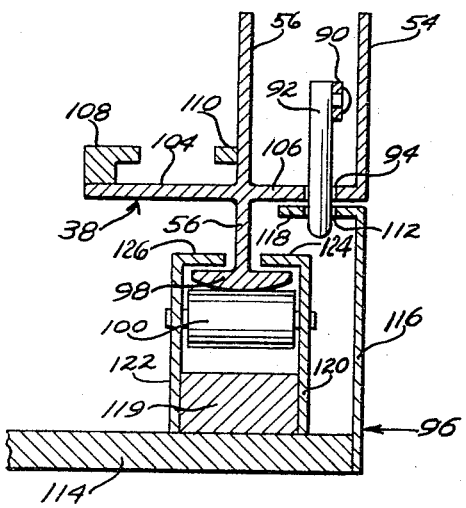
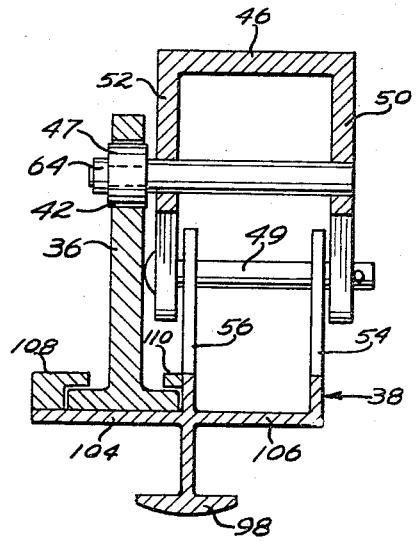
FIG. 5.    FIG. 6.
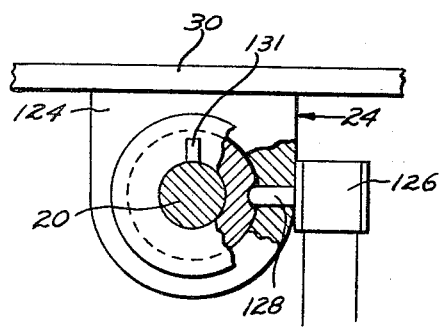
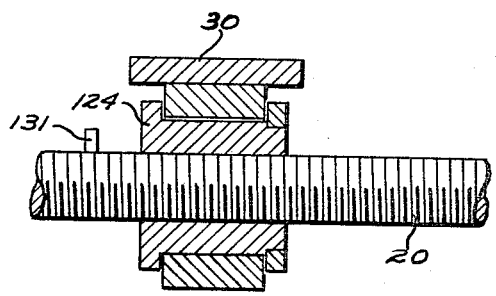
FIG. 7.    FIG. 8.
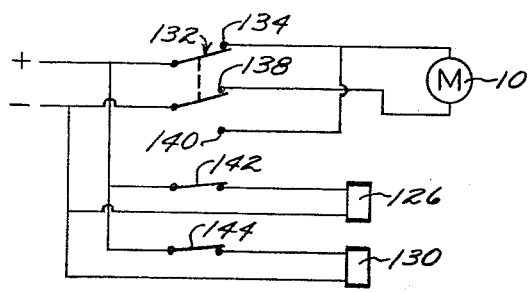
FIG. 9.
*INVENTOR.*
PROCTOR W. NICHOLS
BY
ATTORNEYS United States Patent Office 3,319,921
Patented May 16, 1967

3,319,921
ADJUSTABLE ELECTRICALLY POWERED
AIRCRAFT SEAT
Proctor W. Nichols, Colorado Springs, Colo., assignor to Aircraft Mechanics, Inc., Colorado Springs, Colo., a corporation of Colorado
Filed Apr. 30, 1965, Ser. No. 452,271
7 Claims. (Cl. 248—419)

This invention relates generally to an adjustable seat and in particular to a four-way adjustable electrically powered aircraft seat.

The prior art is known to provide adjustable aircraft seats for effecting a desired change in the pilot's position according to height, leg length, etc. However, it has been found that most of these known devices do not provide sufficient variances nor degree thereof so as to provide a suitable change of position whenever desired.

Accordingly, it is an object of this invention to provide a seat having a wide degree of adjustable variances.

A further object of the invention is to provide an aircraft seat having a minimum of at least four separate adjustments.

Still another object of the present invention is to provide a four-way adjustable aircraft seat having an electrical power arrangement.

In order to understand the invention, reference is directed to the accompanying drawings, wherein:

FIGURE 3 is also a sectional view of the invention along the line 3—3 of FIGURE 1 when fully elevated but with a part of the structure cut away.

FIGURE 4 is an elevation view of the invention with the seat frame fully depressed and showing in outline form the seat frame having the front elevated and the rear portion depressed.

FIGURE 5 illustrates a section on the line 5—5 of FIGURE 2.

FIGURE 6 illustrates a section on the line 6—6 of FIGURE 3.

FIGURE 7 is a cross sectional view of one of the solenoid controlled nuts.

FIGURE 8 is a longitudinal section through the acme screw and one of the solenoid actuated nuts; and FIGURE 9 is a diagrammatic view of the wiring setup.

Figure 1:
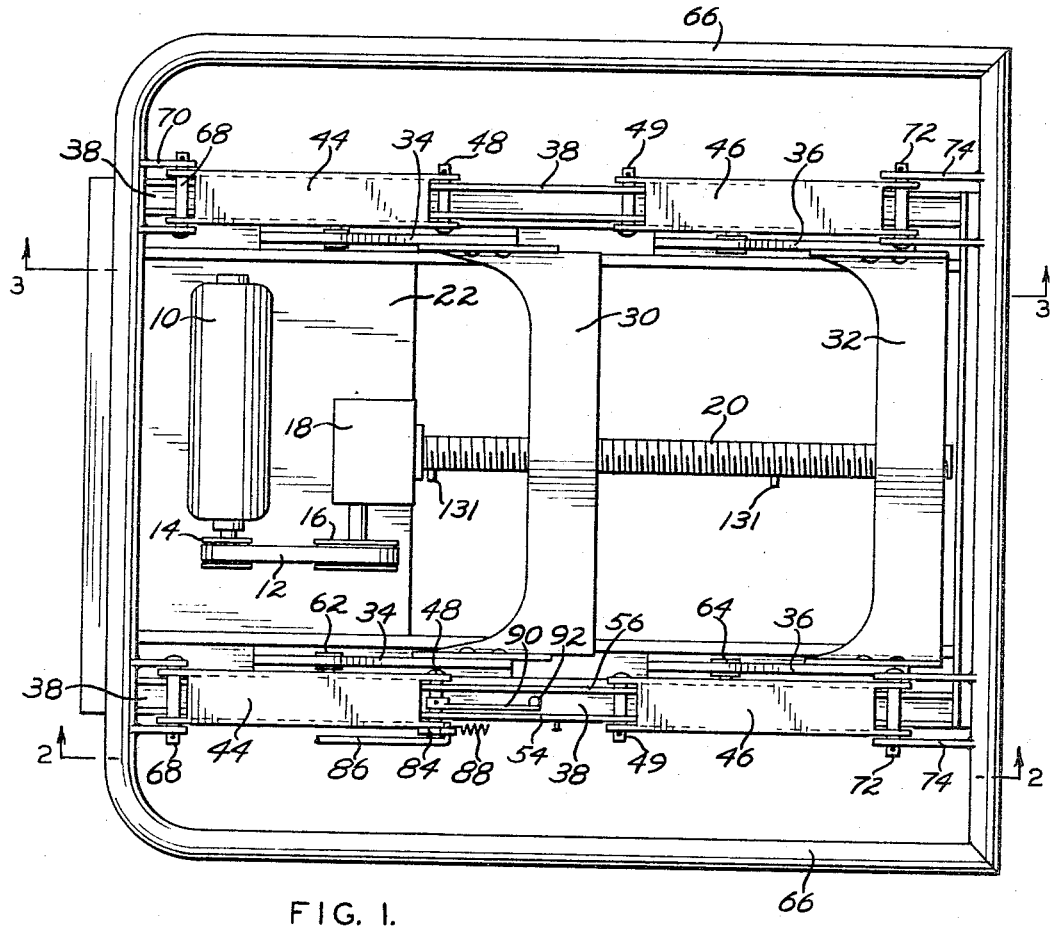
FIGURE 1 is a top plan view of the invention.

With reference to the drawings, 10 refers to an electrically powered actuating motor. It is connected through the belt 12 and pulleys 14 and 16 to the speed reducer 18 which drives or rather rotates acme screw 20. The motor 10 and the speed reducer 18 are both mounted on the plate 22. Positioned on screw 20 are two solenoid operated nuts 24 and 26. It should be noted that the two aforementioned nuts 24 and 26 remain in the same position relative to the acme screw 20 regardless of whether the said screw is turning or not. However, when the solenoid operated nuts 24 and 26 are energized they are prevented from rotating with the screw 20. Accordingly, they will travel along the screw 20 in a direction determined by the movement of the acme screw—clockwise or counterclockwise. These solenoid operated nuts will be further elaborated on in detail later in the specification.

The nuts 24 and 26 are connected to the bottom metal portion of carriages 30 and 32 respectively. Carriage 30 in turn is riveted at both its lateral edges to the parallel wedge-shaped cams 34 while carriage 32 is similarly riveted to parallel cams 36. Thus it is easily seen that since the nuts 24 and 26 are connected to the carriages 30 and 32 any movement of the said nuts along the screw 20 will also equivalently move the carriages in the same direction.

Figure 2:
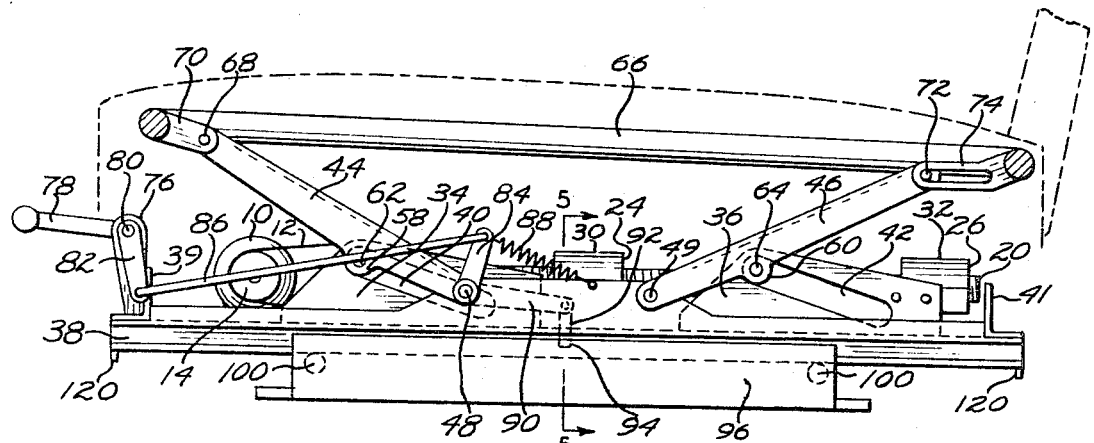
FIGURE 2 is a sectional view of the invention along the line 2—2 of FIGURE 1 showing the seat frame fully elevated.

The cams 34 and 36 are positioned in a longitudinally slidable manner on the parallel side rails 38 best shown in FIGURES 2 and 6. They are each provided with a cam slot 40 and 42 as shown in FIGURE 2. Since the carriages 30 and 32 are connected to the said cams 34 and 36 any movement of the carriages will obviously also slide the cams 34 and 36 longitudinally along the rails 38. The cam stops 39 and 41 positioned at each end respectively of side rails 38 prevent the cams 34 and 36 from accidently running off the side rails 38.

Arms 44 and 46 are preferably heavy inverted U-shaped members shown in FIGURES 1, 2 and 6. They are pivotally connected at their lower ends to the side rails 38 by the pins 48 and 49. Referring to FIGURE 6, it will be noted that in the preferred embodiment, the pin 49 as well as pin 48 although not shown in FIGURE 6, extends through both of the parallel portions 50 and 52 of the U-shaped arm 46 and the two upright members 54 and 56 of the side rails 38 which are positioned interiorly to the said parallel portions 50 and 52 thus providing a lower pivot point for arm 46. The arm 44 is identically pivotally connected at its lower end to the same structure of the side rails 38, that is pin 48 positioned anteriorly to the said pin 49 extends through the parallel portions 50 and 52 of arm 44 and the two upright members 54 and 56 of the side rails 38. Arm 44 is pivotally connected at its upper end to seat frame 66 by the pin 68 and the connector 70. Arm 46 is slidably connected to the frame 66 by the pin 72 and the connector 74. It is to be noted that the connector 74 contains a longitudinal slot therein allowing a slight longitudinal sliding movement of the pin 72 which in turn transmits a longitudinal movement to the arm 46. Extending from each of the lower edges of parallel portions 50 and 52 of arms 44 and 46 are the pairs of small protrusions 58 and 60. Pins 62 and 64 are rotatably positioned and extend through the protrusions 58 and 60 of arms 44 and 46 into the cam slots 40 and 42 of cams 34 and 36 where they are connected to the rotatable cam followers 45 and 47 respectively. It is clear then that as the cams 34 and 36 slide on the side rails 38, the cam followers 45 and 47 will move in the slots 40 and 42 thereby moving pin 62 and 64 which in turn pivots arms 44 and 46 at their lower pivot points described above. Since the upper end of arm 44 is pivotally connected to the front of seat frame 66 and since arm 46 is slidably connected to the rear portion of seat frame 66, the frame and any seat connected thereto will be lowered or raised. Of course the direction of movement will depend on which way the solenoid actuated nuts 24 and 26 move on the screw 20.

Referring to FIGURE 2 it will be seen that upright member 76 is mounted on cam stop 39. The hand lever 78 is pivotally connected to the top and interior portion of upright member 76 by pin 80. On the outside of upright member 76 the second lever 82 is also pivotally connected thereto at its upper end by the same pin 80. A third lever 84 is pivotally connected to the outer side of one of side rails 38 by the pin 48. It will be remembered that pin 48 serves as the connecting element of arm 44 to the side rail 38. Rod 86 connects the lower end of the second lever 82 with the top or upper end of the third lever 84. It will be noted that lever 84 is maintained under constant spring tension in a clockwise direction by the spring 88 connected to said lever 84 and the side rail 38. Also pivotally connected to pin 48 between the upright members 54 and 56 of side rails 38 and extending in a longitudinal direction is the fourth lever 90. The finger 92 is mounted at its upper end in a fixed manner to the rear portion of the said lever 90. It extends in a vertical direction. The purpose of the finger 92 is to fit in any one of several spaced apertures 94 and 112 cut into the side rail and base rail respectively thereby holding the side rails 38 and all of the structures associated therewith in a fixed position.

The aforementioned side rails 38 are shown in each of FIGURES 2, 5 and 6. The rails 38 include wide bottom structure 98. This structure is slidably supported on the rollers 100 mounted in a rotatable manner at each end of the base rail 96. The bottom structure 98 has an upwardly directed web portion 56. Above the bottom 98, the web has extensions 104 and 106 extending laterally on each side thereof. The lateral edge of extension 106 is upturned and continues in an upwards direction parallel to the neck 56 being identified previously as upright member 54. The extension 104 at its lateral edge is continued upwards a short distance and provided a reverse bend as the angular structure 108. Extension 110 protrudes from upright web member 56 in aligned relation to the angular structure 108. The lateral extension 106 contains aperture 94 therein receiving pin 92. A plurality of matching apertures 112 are provided in the base rail 96 just underneath aperture 94 in the lateral extension 106 of side rails 38 to receive pin 92 passing aperture 94. The purpose, as previously stated, is to provide various positions along the base rail 96 at which the side rails 38 and attached structures can be locked together in selected positions. This, of course, provides various stations along the base rails 96 at which the seat attached to the frame 66 can be positioned. It will be noted that the lateral extension 104, angular structure 108 and protrusion 110 provide a pathway along which the cams 34 and 36 can slide. Note also FIGURE 6 in this respect.

Base rails 96 also have several identifiable structures. Note FIGURE 5. The base rail support 114 has a vertically extending member 116 attached at its outside margin which extends vertically toward the side rails 38. Just short of the lateral extension 106 of the side rails 38, the vertical member 116 is turned inwardly and is identified as finger 118. Finger 118 extends parallel to the said lateral extension 106. The above mentioned spaced apertures 112 are cut into the finger 118 so as to match the aperture in the lateral structure 106. The finger 92 mentioned above will extend through aperture 94 and into 112 thus tying the side rails and attached structures into a non-movable relationship with the base rail 96 which is to be permanently mounted in the craft. Spaced inwardly of upright 116 and mounted on base 114 is a generally U-shaped structure having a base portion 119 and vertically extending arm members 120 and 122 which extend parallel to each other and to vertical member 116. At the upper extremities thereof and substantially below finger 118 the arms 120 and 122 are provided with inturned portions 124 and 126 which terminate short of each other leaving a narrow opening through which the upright web portion 56 of side rails 38 is received and extends. The rollers 100 positioned at each end of the base rails 96 are mounted between the arm members 120 and 122. Rollers 100 provide support for the bottom structure 98 of the side rails 38. Thus in changing the position of the seat in a forward or rearward direction, the lever 78 is raised moving lever 82 clockwise which in turn pulls the rod 86 forward. This moves lever 84 counterclockwise under tension by the spring 88. The counterclockwise movement of lever 84 moves lever 90 counterclockwise thereby lifting finger 92 from the apertures 94 and 112 of the side rails 38 and base rails 96 respectively. The side rails and attached structures including a seat is then moved to a desired position along the base rail 96 where the lever 78 is released and the opposite function as just described of each lever is effected. This is due primarily to spring 88 which by causing a spring tension on lever 84 will indirectly also cause the entire lever system to be under a spring tension. The finger 92 will obviously slip into the nearest apertures 112 anchoring the seat once again into an unmovable position. It will be noted that the slight extensions 120 mounted at the front and rear of bottom structure 98 prevent the side rails 38 from accidentally moving off the supporting rollers 100.

FIGURE 7 shows a cross sectional view of one of the solenoid operated nuts. The following specific description relates to nut 24. However, it is understood that the same description and operation will also apply to nut 26 and its corresponding solenoid 130. It will be seen the nut 24 is positioned around acme screw 20 and is bearinged in the holder 124. Nut 24 will turn whenever the screw 20 turns and its position relative to the screw will remain the same. However, whenever the solenoid 126 is energized the solenoid tongue 128 is forced into engagement with the nut 24 thus preventing the aforesaid nut from turning with the screw 20. This, of course, forces the nut 24 to move either forward or rearward along the screw 20 whenever the same is rotated clockwise or counterclockwise. As stated previously the carriages 30 and 32 are connected by their holders 124 to the nuts 24 and 26 respectively. Accordingly, as the said nuts 24 and 26 move along the screw 20 the carriages will also move the same relative distance. Screw pins 131 extend from the front and rear of the screw 20. Their function is to prevent either nut 24 or 26 from being accidentally screwed off either end of screw 20.

FIGURE 9 shows a diagram of the wiring used in the present invention. The motor direction switch 132 whenever closed at contact point 134 and at point 138 will cause the motor 10 to be connected to a power source, not shown, to run in a selected direction. However, when switch 132 is closed at point 138 and at point 140 the direction of motor 10 is reversed.

Switch 142 when closed will energize solenoid 126 while switch 144 will energize solenoid 130. It is thus seen that both of solenoids 126 and 130 are capable of being individually operated thereby permitting individual movement of the nuts 24 and 26.

Thus upon energization of both solenoids 126 and 130 the tongue 128 in both solenoids will engage the nuts 24 and 26. This prevents their rotation with the screw 20 and instead they will move to a different position along the said screw 20. Since the cams 34 and 36 are connected to nuts 24 and 26 by the carriages 30 and 32, the said cams 34 and 36 will slide on the side rails 38 in the manner described above. If the screw 20 is turning in a direction which forces the activated nuts 24 and 26 toward the rear of screw 20, and at the same time forces cams 34 and 36 rearward along the side rails 38, the pins 62 and 64 will move within the cam slots 40 and 42 to the upper level thereof forcing the arms 44 and 46 to pivot at their lower pivot points 48 and 49. Since the arm 44 is pivotally connected to frame 66 at its front and since arm 46 is connected to the rear portion of frame 66, the frame and seat connected thereto will be raised. To lower the frame 66 and seat attached thereto, the motor is merely reversed which rotates the screw 20 in the opposite direction. The solenoids 126 and 130 are again energized permitting the nuts 24 and 26 to move toward the front of screw 20 and also forcing cams 34 and 36 forward along side rails 38. This forces pins 62 and 64 to move within cam slots 40 and 42 to the lower level thereof pivoting arms 44 and 46 at pivot points 48 and 49 in a downward manner. Since arm 44 is pivotally connected to the front of frame 66 and since arm 46 is connected to the rear of frame 66, the frame and seat attached thereto will obviously be lowered. It is pointed out that since the nuts 24 and 26 are capable of being energized independently of one another the front of the frame 66 may be raised while the rear of the frame 66 remains depressed or vice versa. For example, nut 24 is energized by solenoid 126 and if the front of the frame 66 is to be raised nut 24 will move rearward on screw 20 thus sliding cam 34 rearward on side rails 38. This will then force pin 62 to move within cam slot 40 to the upper level thereof forcing arm 44 to pivot at 48. Since arm 44 is connected to the front of frame 66 and any seat thereon, the front portion will be raised. Since the rear nut 26 was not activated, the rear portion of frame 66 remains depressed. The opposite relationship or raising the rear of the frame while the front remains depressed or any other variation as to elevation or depression of the front and rear of the frame 66 may be effected by careful energization of the solenoid operated nuts 24 and 26.

A forward or rearward movement of frame 66 and seat attached thereto is carried out by raising the finger 92 from one of the apertures 112 in the base rails 96 and then forcing the side rails and attached structure including the seat to a desired more forwardly or more rearwardly position of the base rails 96. The finger 92 is then permitted to slide into the nearest aperture 112 anchoring the seat once again in an immovable position. Control of the finger 92 is accomplished by the hand lever 78 which when pulled upward will move the levers 82, 84 and 90 as well as bar 86 in the proper direction as set forth previously which in turn lifts the finger 92 from the apertures 112. Upon release of lever 78 the aforementioned levers are also pivoted to their original position and allows the finger once again to slip into the apertures 112.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. An adjustable seat comprising a support, a pair of parallel rails mounted on said support and designed to permit manual longitudinal movement of said rails along said support, a screw operatively positioned on said support, reversible drive means operatively connected to said screw and mounted on said support, power operated means positioned on said screw and adapted to travel along said screw upon energization of said power means, a pair of front and rear camming means mounted for longitudinal movement along said parallel rails and operatively connected for movement with said power actuated means, a seat means pivotally connected to said longitudinal movable parallel rails and operatively connected to said front and rear camming means thus providing a seat which is manually movable in a longitudinal direction and selectively power movable in a vertical direction.

2. An adjustable seat as set forth in claim 1 wherein the power operated means positioned on said screw comprises front and rear power operated nuts capable of being moved independently along said screw upon rotation thereof and each nut operatively connected respectively to the said front and rear camming means.

3. An adjustable seat comprising:
a support,
parallel rails mounted in a longitudinally movable manner on said support,
screw means positioned between said parallel rails,
reversible drive means operatively connected to said screw mounted anteriorly thereof and between said parallel rails,
power actuated means operatively positioned on said screw, said power actuated means being adapted to travel along said screw upon rotation thereof and upon actuation of the said power actuated means,
a pair of front and rear cam means mounted in a longitudinally movable manner on said parallel rails, each cam means being operatively connected for movement with said power actuated means, said cam means having a cam surface,
a cam follower positioned in contact with the cam surface of the front and rear pairs of said cam means,
a pair of parallel front and rear arms pivotally connected at their lower ends to each of the said parallel rails and having their lower middle portion connected to the said cam followers, said arms being adapted to be pivoted to a desired position upon movement of said cam followers along said cam surfaces,
a seat frame pivotally connected on each side at the front and rear thereof to the upper ends of said parallel front and rear arms respectively, and
a seat mounted on said frame, to provide a seat which is manually movable in a longitudinal direction and selectively power movable in a vertical direction at both the front and rear thereof.

4. An adjustable seat comprising
a support,
parallel rails mounted for longitudinal movement on said support,
screw means positioned between said parallel rails,
reversible drive means operatively connected to said screw mounted anteriorly thereof and between said parallel rails,
front and rear power actuated nuts operatively positioned on said screw, each nut adapted to move independently along the said screw upon rotation thereof and application of power to said power actuated nuts,
a pair of front and rear cam means mounted for longitudinal movement on said parallel rails each pair of cams being operatively connected for movement with said front and rear power actuated nuts, said cams having a cam surface,
a cam follower positioned in contact with the cam surface of the front and rear pairs of said cams,
a pair of parallel front and rear arms pivotally connected at their lower ends to each of the said parallel rails and intermediate the ends thereof to the said cam follower, said arms being adapted to be pivoted to a desired position upon movement of said cam follower along said cam surfaces,
a seat frame pivotally connected on each side at the front and rear to the upper ends of said parallel front and rear arms respectively, and
a seat mounted on said frame, to provide a seat which is manually movable in a longitudinal direction and selectively power movable in a vertical direction at both the front and rear thereof.

5. An adjustable seat comprising
a support,
parallel rails mounted for longitudinal slidable movement on said support,
manually movable lever means providing a suitable optional connection between said support and said parallel rails at selected positions therealong,
screw means positioned between said parallel rails,
reversible drive means operatively connected to said screw mounted anteriorly thereof and between said parallel rails,
front and rear power actuated nuts operatively positioned on said screw, each nut adapted to move independently along the said screw upon rotation thereof and application of power to said power actuated nuts,
a pair of front and rear cam means mounted for longitudinal movement on said parallel rails, each pair of cams being operatively connected for movement with said front and rear power actuated nuts, said cams having a cam surface,
a cam follower positioned in contact with the cam surface of the front and rear pairs of said cams,
a pair of parallel front and rear arms pivotally connected at their lower ends to each of the said parallel rails and intermediate the ends thereof to the said cam follower, said arms being adapted to be pivoted to a desired position upon movement of said cam follower along said cam surfaces, a seat frame pivotally connected on each side at the front and rear to the upper ends of said parallel front and rear arms respectively, and a seat mounted on said frame, to provide a seat which is manually movable in a longitudinal direction and selectively power movable in a vertical direction at both the front and rear thereof.

6. An adjustable seat comprising a support, parallel rails mounted for longitudinal movement on said support, manually movable lever means providing a suitable optional connection between said support and said parallel rails at selected positions therealong, screw means positioned between said parallel rails, reversible drive means operatively connected to said screw mounted anteriorly thereof and between said parallel rails, front and rear power actuated nuts operatively positioned on said screw, each nut adapted to move independently along the said screw upon rotation thereof and application of power to said power actuated nuts, a pair of front and rear cam means mounted for longitudinal movement on said parallel rails, each pair of cams being operatively connected for movement with said front and rear power actuated nuts, said cams having a cam surface, a cam follower positioned in contact with the cam surface of the front and rear pairs of said cams, a pair of parallel front and rear arms pivotally connected at their lower ends to each of the said parallel rails and intermediate the ends thereof to the said cam follower, said arms being adapted to be pivoted to a desired position upon movement of said cam follower along said cam surfaces, a seat frame pivotally connected on each side at the front and rear to the upper ends of said parallel front arms and at the rear slidably connected to said rear arms, and a seat mounted on said frame, to provide a seat which is manually movable in a longitudinal direction and selectively power movable in a vertical direction at both the front and rear thereof.

7. An adjustable seat comprising a support having a plurality of spaced apertures therealong, parallel rails mounted for longitudinal slidable movement on said support, manually movable lever means mounted on said rails and having an end thereof extendable through an aperture on said support to provide a rigid connection between said support and said parallel rails at selected positions therealong, screw means positioned between said parallel rails, reversible drive means operatively connected to said screw mounted anteriorly thereof and between said parallel rails, front and rear power actuated nuts operatively positioned on said screw, each nut adapted to move independently along the said screw upon rotation thereof and application of power to said power actuated nuts, a pair of front and rear cam means mounted for longitudinal movement on said parallel rails each pair of cams being operatively connected for movement with said front and rear power actuated nuts, said cams having a cam surface, a cam follower positioned in contact with the cam surface of the front and rear pairs of said cams, a pair of parallel front and rear arms pivotally connected at their lower ends to each of the said parallel rails and intermediate the ends thereof to the said cam follower, said arms being adapted to be pivoted to a desired position upon movement of said cam follower along said cam surfaces, a seat frame pivotally connected on each side at the front and rear to the upper ends of said parallel front arms and at the rear slidably connected to said rear arms, and a seat mounted on said frame, to provide a seat which is manually movable in a longitudinal direction and selectively power movable in a vertical direction at both the front and rear thereof.

References Cited by the Examiner

UNITED STATES PATENTS

| | | | |
|---|---|---|---|
| 2,827,105 | 3/1958 | Brundage | 248—394 |
| 2,892,483 | 6/1959 | De Rose | 248—394 |
| 3,123,333 | 3/1964 | De Rose | 248—394 |
| 3,188,044 | 6/1965 | Epple | 248—419 |

CHANCELLOR E. HARRIS, *Primary Examiner.*

CLAUDE A. LE ROY, *Examiner.*

R. P. SEITTER, *Assistant Examiner.*